March 5, 1946. J. G. RITTER 2,395,940
STABILIZING APPARATUS
Filed May 29, 1944
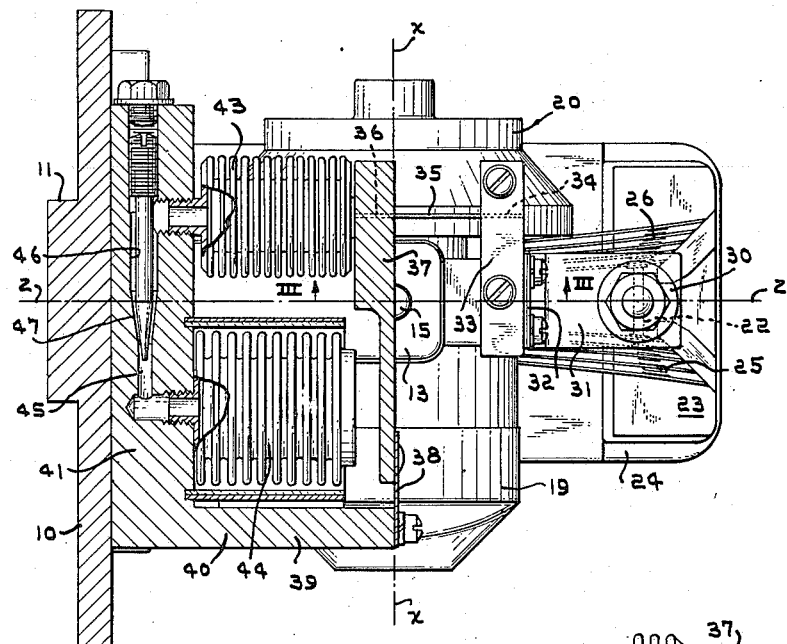
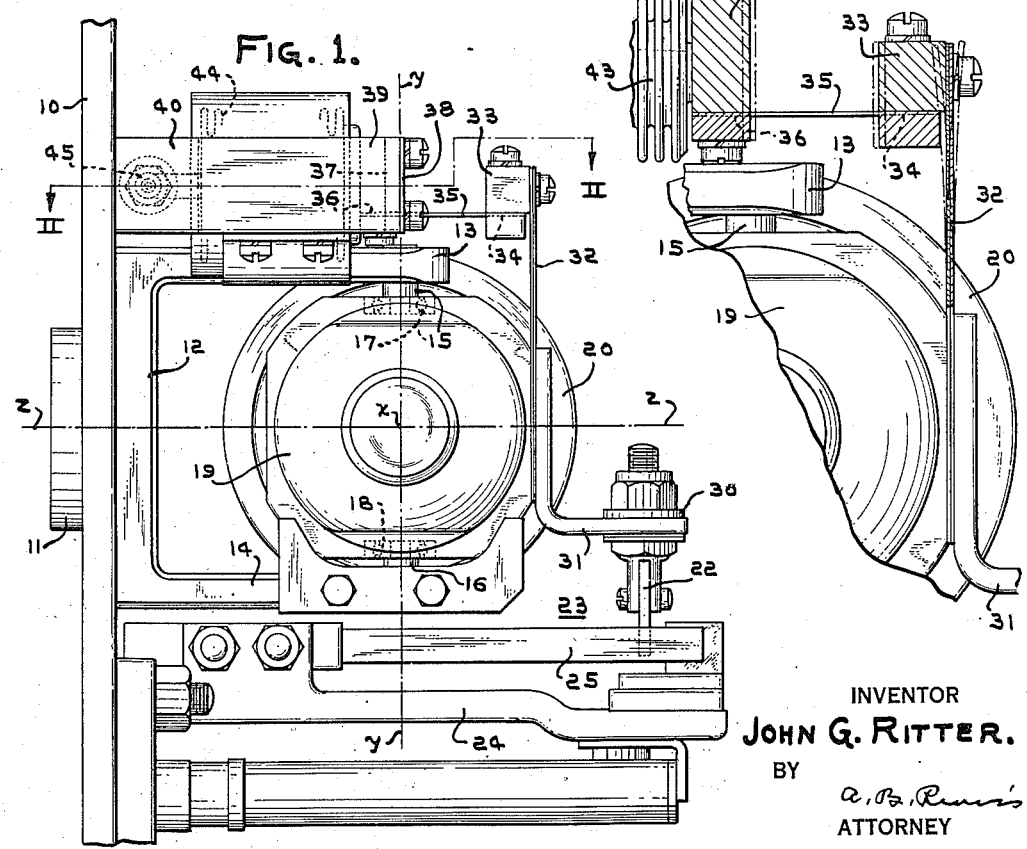
INVENTOR
JOHN G. RITTER.
BY
ATTORNEY Patented Mar. 5, 1946

2,395,940

UNITED STATES PATENT OFFICE 2,395,940

STABILIZING APPARATUS

John G. Ritter, Springfield, Mass., assignor to Westinghouse Electric Corporation, East Pittsburgh, Pa., a corporation of Pennsylvania Application May 29, 1944, Serial No. 537,772

2 Claims. (Cl. 74—5)

The invention relates to stabilizing apparatus of the gyroscopic type wherein a liquid damper is connected to the gyro so as to be effective about the precession axis of the latter, and it has for an object to provide a connection which compensates for expansion and contraction of the damper liquid incident to temperature changes, whereby effectiveness of the gyro for its purpose may be maintained over a wide range of temperatures.

In the applications of Clinton R. Hanna, Serial No. 366,877, filed November 23, 1940 and Serial No. 514,019, filed December 13, 1943, there is disclosed and claimed apparatus for stabilizing a pivotally mounted body to maintain the latter in a desired angular position irrespective of disturbances. While such apparatus may be used for any suitable purpose, it is particularly useful in stabilizing a gun pivotally mounted on a vehicle such as a tank. The vehicle body and the gun are connected by power means controlled so as to maintain the gun approximately in the wanted position. Preferably, the power means is comprised by a piston and a cylinder connecting the gun and the vehicle body, the piston being arranged in the cylinder and dividing the interior of the latter into upper and lower pressure chambers which are connected by passages to the outlets of a pair of positive displacement pumps. The chambers and the passages form pressure spaces to which liquid is supplied by the pumps, and the pressure in these spaces are varied differentially so as to act on the piston to oppose change in angular position of the gun and to restore it to the wanted position irrespective of disturbances due to travel of the vehicle. The pressures in the spaces are controlled by means of by-pass or escape valves which have forces applied thereto by means of a gyro so as to provide for differential liquid pressures for stabilization. The gyro is operatively connected to the gun so as to precess in response to angular velocity of displacement thereof, and precessional movement of the gyro is used to provide variable forces applied to the by-pass valves to vary the pressures of liquid in the pressure spaces. Preferably, the gyro operates a control device including actuating and actuated parts, the actuated part comprising a pair of groups of self-opening spring contacts which are opened and closed to vary electric currents in a pair of circuits differentially in opposite directions and the currents are used to apply magnetic forces to the by-pass or escape valves, the magnetic force applied to each valve tending to move it in a closing direction and the force of liquid pressure in the associated space acting on the valve and tending to move it in an opening direction. In addition to velocity of displacement of the gun or body which is stabilized, displacement itself is used as a factor of control so that the gun or body member may be maintained approximately in the wanted position. With angular movement occurring in a vertical plane, the required reference may be provided by a mass responsive to gravity, and the effect of displacement with respect to the vertical is exerted on the control device, this result being accomplished in the first-mentioned application by having the actuated part of the control device carried by a stabilized pendulum, and, in the second-mentioned application, by having a mass arranged to exert a side force on the gyro when the latter precesses, whereby such mass, acting through the gyro, exerts its effect on the actuating part of the control device. In both arrangements, operation of the stabilizing apparatus is very largely under control of the gyro precessing in response to displacement velocity of the gun or body member being stabilized, the means responsive to gravity serving mainly to assure of return of the gun or body member to a desired position.

A liquid damper acts on the gyro to prevent whipping of the latter into some frequency higher than that required for stabilization. Where the stabilizer is used under widely varying temperature conditions, expansion and contraction of the liquid of the damper is a disturbing factor; and, to overcome this objection, the present invention has for an object the incorporation of means to compensate substantially for the effect of volumetric change of the liquid on the linkage occasioned by the changes in temperature.

A more particular object of the invention is to provide a stabilizer wherein a supporting member carries a gyro and a bellows damper and the gyro and damper are connected by mechanical linkage including a bimetallic bar attached to the gyro and connected to the damper so that its deflection in response to temperature changes may compensate for volumetric changes of the damper liquid due to such temperature changes.

These and other objects are effected by the invention as will be apparent from the following description and claims taken in connection with the accompanying drawing, forming a part of this application, in which:

Fig. 1 is an end elevation of the improved gyro;

Fig. 2 is a sectional view taken along the line II—II of Fig. 1; and

Fig. 3 is a sectional detail view taken along the line III—III of Fig. 2.

Referring more particularly to the drawing, there is shown a supporting plate 10 connected to move angularly with the gun or object (not shown) to be stabilized, the plate being shown as having a pivotal mounting 11 whose axis is coincident with or parallel to the trunnion axis of the pivotally mounted gun or body member.

The support 10 has attached thereto a bracket 12 provided with upper and lower arms 13 and 14 having aligned pivot pins 15 and 16 for antifriction bearings 17 and 18 carried by the gyro casing 19 within which is journaled the spinning body or rotor aggregate including the flywheel 20 at one end of the casing. The casing 19 is formed to provide the stator element of an electric motor whose rotor constitutes a part of the spinning body or rotor structure.

The gyro so far described has an inner tilt axis $y$—$y$, the axis of the aligned bearings 17 and 18, which is arranged at right angles to the spin axis $x$—$x$ and to the outer tilt or torque axis constituted by the gun trunnion axis and indicated as the axis $z$—$z$ of the support pivotal mounting 11.

The controlling device for the pair of electric circuits for the by-pass or escape valves of the hydraulic mechanism includes an actuator 22 carried by the gyro and an actuated part, at 23, attached to the supporting plate 10, the actuator 22 being made of suitable insulating material.

The actuated part, at 23, comprises a body member 24 attached to the supporting plate 10 and carrying a pair of groups of self-opening, metallic, spring contact leaves 25 and 26 tapped along resistors included in the circuits, as more particularly shown and described in the applications aforesaid. By progressively opening and closing contacts of each group, the currents in the circuits are varied.

The actuator 22 is connected by an adjustable mounting 30 to an angle bracket 31 attached to the gyro casing 19, the arrangement being such that the actuator is positioned a suitable radial distance from the precession axis $y$—$y$ to provide for desired operation of the contacts. With the actuator in mid position, preferably a desired number of contacts of each group are engaged to provide for "push-pull" operation, as disclosed and claimed in the application of Lawrence B. Lynn, Serial No. 366,918, filed November 23, 1940.

A bar 32 fastened to the gyro extends upwardly from the angle bracket 31 and has its upper end joined to a cross member 33, which is connected, at 34, to one end of a wire link 35 and the other end of the latter is attached, at 36, to the lever 37 joined by a spring hinge 38 to the leg 39 of the L-shaped body member 40 having a base portion 41 attached to the supporting plate 10.

Bellows elements 43 and 44 are attached at one end to the base portion 41 and the latter is formed with a passage 45 connecting the bellows interiors. An adjustable needle valve 46 provides for an adjustable orifice 47 in the passage. The opposite end of the bellows element 43 is connected to the lever 37.

With liquid filling the bellows interiors and the connecting passage, it will be apparent that movement of the lever is accompanied by expansion and contraction of the bellows elements depending upon the direction of movement, movement of the lever toward the base portion resulting in contraction of the bellows element 43 accompanied by flow of liquid therefrom through the passage 45 to the bellows element 44 and the latter expanding. On the other hand, with movement of the lever 37 outwardly from the base portion, the bellows element 43 will be expanded or elongated, liquid flowing thereinto through the passage 45 from the interior of the bellows element 44 and the latter undergoing contraction.

As the bellows lever 37 is connected by a link 35 to the gyro so that its line of action is spaced from the precession axis, it will be apparent that precessional movement of the gyro about the axis $y$—$y$ will result in operation of the damper, because of the crank or lever arm connection of the gyro to the wire 35, the lever arm constituted by the bar 33 being moved angularly about the precession axis to push the wire toward the plate 10 or to pull it away therefrom, whereby the bellows elements are contracted and expanded to obtain the damping operation. With this mechanical arrangement, therefore, the bellows elements and the restricted flow therebetween provide for damping so as to limit the frequency of oscillation of the gyro so as to avoid the latter being whipped into some undesired higher frequency.

With the arrangement shown, the damper liquid, of course, undergoes expansion and contraction with changes in temperature and the apparatus may be rendered ineffective on account thereof, the effect of drop in temperature being to reduce the volume of the liquid and contract the bellows element 43 with the result that a disturbing pull is applied to the gyro and effective about the precession axis. On the other hand, with rise in temperature, the bellows element expands and a push is applied by the wire 35 to the gyro about the precession axis. To avoid these undesired effects on account of temperature changes, the bar 32 is constituted as a bimetallic strip so that it may deflect inwardly and outwardly with respect to the base plate incident to temperature changes, as indicated by the dot-and-dash lines in Fig. 3. Therefore, due to the positional relation of the bimetallic strip 32 with respect to the gyro and with respect to the bellows elements, it will be apparent that, by suitable design and choice of metals going to make up the bimetallic strip, the deflection of the strip may be correlated to the expansion and contraction of the damping liquid due to temperature changes so that the deflection compensates for volumetric change of the liquid sufficiently to avoid disturbance of the gyro.

The bellows means described connects the support 10 to the gyro 19 so as to be effective about the axis of precession of the latter and any suitable part of such means may be constructed and arranged to compensate for volume changes of the damping liquid due to temperature changes. Preferably, the bar 32 is of bimetallic construction to serve this purpose.

While the invention has been shown in but one form, it will be obvious to those skilled in the art that it is not so limited, but is susceptible of various changes and modifications without departing from the spirit thereof, and it is desired, therefore, that only such limitations shall be placed thereupon as are specifically set forth in the appended claims.

What is claimed is:

1. Controlling means for apparatus for stabilizing a body member with respect to its mounting axis, comprising, a support movable angularly with the body member; a gyro carried by the support and arranged to precess in response to velocity of angular movement of the latter; a control device including an actuated part carried by said support and an actuator constituted by a precessionally-moved part of the gyro; and bellows means connecting the support and the gyro so as to be effective about the axis of precession of the latter, expansible and contractible to displace liquid to exert a damping effect on the gyro about the precession axis, and including a bimetallic element effective to compensate for volumetric changes of damping liquid due to temperature changes to avoid the imposition of disturbing effects on the gyro about the precession axis because of such volumetric changes of damping liquid.

2. Controlling means for apparatus for stabilizing a body member with respect to its mounting axis, comprising, a support movable angularly with the body member, a gyro carried by the support and arranged to precess in response to velocity of angular movement of the latter, a control device including an actuated part carried by said support and an actuator constituted by a precessionally-moved part of the gyro, damper means carried by said support, said damper means including a member which is movable in opposite directions to displace liquid to effect the damping operation, a bar attached at one end to the gyro casing, a cross member attached to the other end of the bar, and a link connecting the cross member and the movable member of the damper and positioned so that its line of action is spaced laterally from the precession axis, said bar being constituted by a bimetallic strip whose deflection compensates for volumetric changes of the damping liquid due to changes in temperature to avoid the imposition of disturbing effects on the gyro about the precession axis due to contraction and expansion of the damping liquid because of temperature changes.

JOHN G. RITTER.